(12) United States Patent
Wang et al.

(10) Patent No.: US 7,318,904 B2
(45) Date of Patent: Jan. 15, 2008

(54) CATALYTIC SYNTHESIS OF METAL CRYSTALS USING CONDUCTIVE POLYMERS

(75) Inventors: Hsing-Lin Wang, Los Alamos, NM (US); Wenguang Li, Los Alamos, NM (US)

(73) Assignee: Los Alamos National Security, LLC, Los Alamos, NM (US)

(*) Notice: Subject to any disclaimer, the term of this patent is extended or adjusted under 35 U.S.C. 154(b) by 172 days.

(21) Appl. No.: 11/110,343

(22) Filed: Apr. 19, 2005

(65) Prior Publication Data

US 2006/0231805 A1    Oct. 19, 2006

(51) Int. Cl.
H01B 1/02 (2006.01)
H01B 1/12 (2006.01)
H01B 1/08 (2006.01)

(52) U.S. Cl. ............... 252/512; 252/518.1; 252/519.33

(58) Field of Classification Search ............... 252/506, 252/518.1, 519.33, 512; 528/422, 423
See application file for complete search history.

(56) References Cited

U.S. PATENT DOCUMENTS 5,215,820 A * 6/1993 Hosokawa et al. ......... 428/403
5,411,573 A * 5/1995 Kang et al. .................... 75/721
6,632,380 B1 * 10/2003 Wessling .................... 252/500
6,899,829 B2 * 5/2005 Shelnut et al. ............. 427/97.1

OTHER PUBLICATIONS

Zhang et al., "A new Approach to Hybrid Polymer-Metal and Polymer-Semiconductor Particles," Adv. Mater. 2002, 14, No. 23, Dec. 3.

Lindlar et al., "Synthesis of Monodisperse Magnetic Methacrylate Polymer Particles," Adv. Mater. 2002, 14, No. 22, Nov. 18.

Zhang et al., "A New Approach to Hybrid Nanocomposite Materials with Periodic Structures," J. Am. Chem. Soc. 2002, 124, 145122-14513.

Lowe et al., "Facile Preparation of Transition Metal Nanoparticles stabilized by Well-Defined (Co)polymers Synthesized Via Aqueous reversible Addition-Fragmentation chain Transfer Polymerization," J. Am. Chem. Soc. 2002, 124, 11562-11563.

Weare et al., "Improved Synthesis of Small ($d_{core} \approx 1.5$ nm) Phosphine-Stabilized Gold Nanoparticles," J. Am. Chem. Soc. 2000, 122, 12890-12891.

Zheng et al., "Individual Water-Soluble Dendrimer-Encapsulated Silver nanodot Fluorescence," J.Am. chem.. soc. 2002, 124, 13982-13983.

Wang et al., "Preparation of Nanosized metallic Particles in Polyaniline," Journal of Colloid and Interface Scinece 239, (78-86 (2001).

* cited by examiner

*Primary Examiner*—Mark Kopec
*Assistant Examiner*—Jaison Thomas
(74) *Attorney, Agent, or Firm*—Robert P. Santandrea; Holly L. Teeter (57) ABSTRACT

A method of forming metal nanoparticles using a polymer colloid that includes at least one conductive polymer and at least one polyelectrolyte. Metal ions are reduced in water by the conductive polymer to produce the nanoparticles, which may be then incorporated in the colloidal structure to form a colloid composite. The method can also be used to separate selected metal ions from aqueous solutions.

39 Claims, 6 Drawing Sheets

CATALYTIC SYNTHESIS OF METAL CRYSTALS USING CONDUCTIVE POLYMERS

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates to the synthesis of metal crystals using conductive polymers. More particularly, the invention relates to the synthesis of a composite comprising nanoparticles of such metal crystals dispersed throughout a conductive polymer. The invention also relates to removal of selected metal ions from a volume of water by use of a conductive polymer colloid.

BACKGROUND OF THE INVENTION

Metal nanoparticles have sparked interest because of their potential use as catalysts, absorbents, chemical and biological sensors, and photonic and electronic devices.

Traditionally, the synthesis of such nanoparticles is carried out chemically, either in the presence of a reducing agent, such as sodium borohydride ($NaBH_4$), or by irradiating groups of metal ions to form nanoparticles. In essence, metal ions are reduced in the presence of a template that draws nearby metal ions together to form nanoparticles. Inverse micelles have also been used to grow nanoparticles, but this process generally suffers from low yield and stability in the air-oxygen environment. Physical methods, such as grinding and laser ablation, have been used to prepare metal nanoparticles as well.

To avoid flocculation, synthesized nanoparticles are often stabilized by polymers, copolymers, or DNA molecules. Another technique uses a dendrimer template to encapsulate and stabilize nanoparticles. In addition, microbially based synthesis embeds nanoparticles in the organic matrix of the bacteria.

None of the above referenced synthetic routes provide a method of obtaining metal nanoparticles that is simple, adaptable to large-scale production, and environmentally friendly. Therefore, what is needed is a method of forming metal nanoparticles that is environmentally friendly and adaptable to large scale synthesis.

SUMMARY OF THE INVENTION

The present invention meets these and other needs by providing a method of forming metal nanoparticles using a polymer colloid comprising a conductive polymer. Metal ions are reduced in water by the conductive polymer to produce the nanoparticles, which may be then incorporated in the colloidal structure to form a colloid composite. The method can also be used to separate selected metal ions from aqueous solutions.

Accordingly, one aspect of the invention is to provide a method of making a composite colloid. The composite colloid comprises a colloid and at least one metal in elemental form. The method comprises the steps of: providing a colloid comprising at least one conductive polymer and at least one polyelectrolyte, wherein the at least one conductive polymer has a reduction potential; providing an aqueous solution comprising ions of the at least one metal, wherein the ions have a reduction potential that is greater than the reduction potential of the at least one conductive polymer; and admixing the colloid and the aqueous solution to form the at least one metal in elemental form, wherein at least a portion of the at least one metal is disposed in a portion of the colloid to form the composite colloid.

Another aspect of the invention is to provide a method making a plurality of nanoparticles. Each of the plurality of nanoparticles comprises at least one metal in elemental form. The method comprises the steps of: providing a colloid comprising at least one conductive polymer and at least one polyelectrolyte, wherein the at least one conductive polymer has a reduction potential; providing an aqueous solution comprising ions of the at least one metal, wherein the ions have a reduction potential that is greater than the reduction potential of the at least one conductive polymer; and incrementally admixing the colloid and the aqueous solution to form the plurality of nanoparticles.

A third aspect of the invention is to provide method of making a composite colloid comprising a colloid and a plurality of nanoparticles. Each of the plurality of nanoparticles comprises at least one metal in elemental form. The method comprises the steps of: providing a colloid comprising at least one conductive polymer and at least one polyelectrolyte, wherein the at least one conductive polymer has a reduction potential; providing an aqueous solution comprising ions of the at least one metal, wherein the ions have a reduction potential that is greater than the reduction potential of the at least one conductive polymer; and incrementally admixing the colloid and the aqueous solution to form the plurality of nanoparticles, wherein at least a portion of the plurality of nanoparticles is disposed in a portion of the colloid to form the composite colloid.

A fourth aspect of the invention is to provide a method of reducing a concentration of selected metal ions from a volume of water. The method comprises the steps of: providing a colloid comprising at least one conductive polymer and at least one polyelectrolyte, wherein the at least one conductive polymer has a reduction potential; providing an aqueous solution comprising the ions of at least one metal, wherein the ions have a reduction potential that is greater than the reduction potential of the at least one conductive polymer; admixing the colloid and the aqueous solution to form a plurality of nanoparticles of the at least one metal in elemental form, wherein at least a portion of the plurality of nanoparticles is disposed in a portion of the colloid to form the composite colloid, and recovering the portion of the at least one metal disposed in the composite colloid from the volume of water, wherein the concentration of the at least one metal within the volume of water is reduced.

A fifth aspect of the invention is to provide a composite colloid. The composite colloid comprises: a colloid comprising at least one conductive polymer and at least one polyelectrolyte; and a plurality of nanoparticles disposed in the colloid, wherein each of the plurality of nanoparticles comprises at least one metal in elemental form.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Figure 1:
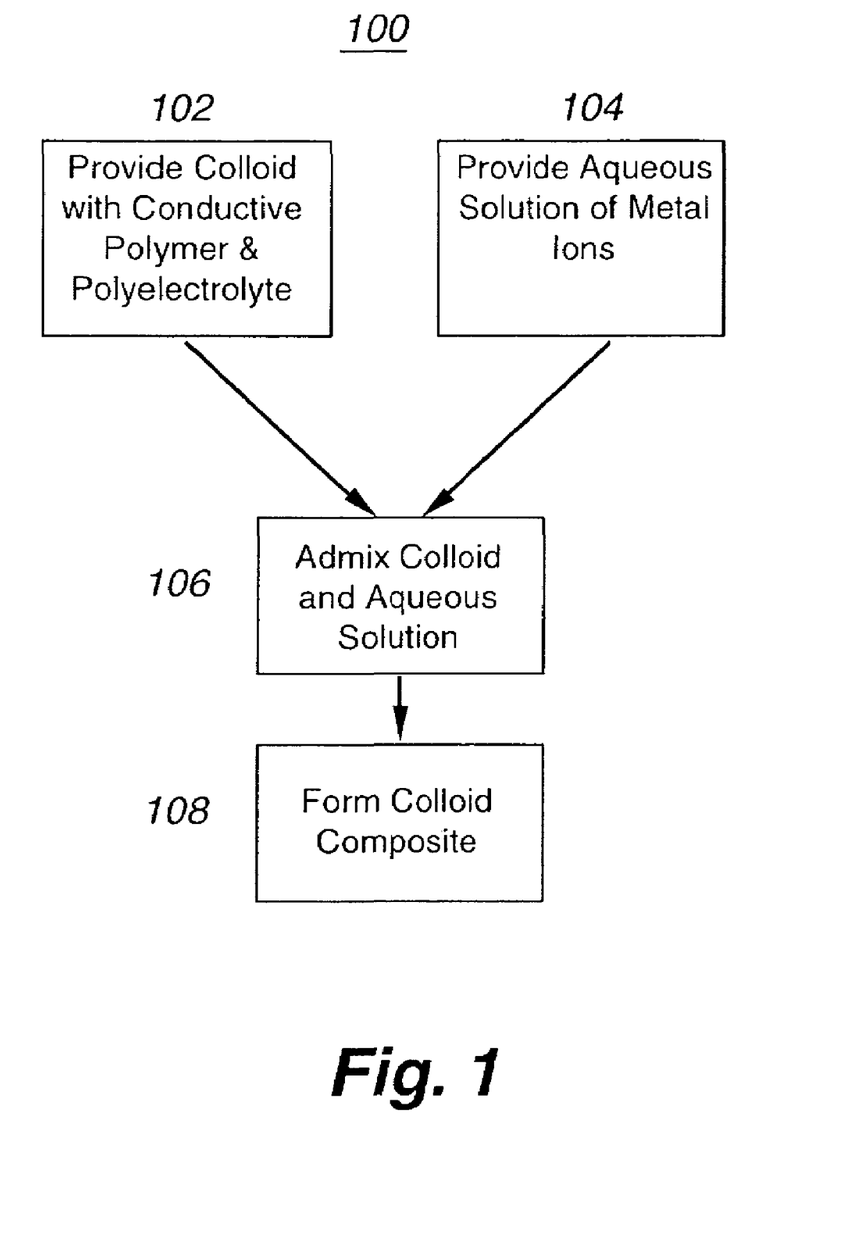
FIG. 1 is a flow chart illustrating a method of making the colloidal composite.

Referring to the drawings in general and to FIG. 1 in particular, it will be understood that the illustrations are for the purpose of describing a particular embodiment of the invention and are not intended to limit the invention thereto. In one embodiment, a method of making a colloid composite is provided. The colloid composite comprises a colloid and at least one metal in elemental form. FIG. 1 is a flow chart illustrating the method of making the colloidal composite. Method 100 comprises separately providing a colloid (Step 102) comprising at least one conductive polymer and an polyelectrolyte, and an aqueous solution comprising ions of at least one metal (Step 104). The ions of the at least one metal have a reduction potential that is greater than that of the conductive polymer. The colloid and aqueous solution are then admixed in Step 106. The metal ions are reduced upon mixing to form the at least one metal in elemental form. At least a portion of the metal in elemental form is deposited in a portion of the colloid to form the composite colloid (Step 108).

In one embodiment, the colloid is a water-dispersible colloid comprising at least one conductive polymer that is selected from a group consisting of polyaniline (also referred to hereinafter as "PANI"), polypyrrole (also referred to hereinafter as "PPy"), xpolythiophene (also referred to hereinafter as PTh"), poly(phenylene vinylene)(also referred to hereinafter as "PPV"), polyfluorene, poly(3,4-ethylenedioxythiophene) (also referred to hereinafter as "PEDOT"), and combinations thereof.

The conductive polymer may be either doped or undoped. A dopant introduces conductivity to the conductive polymer. Dopants include inorganic acids, organic acids, polymer acids, and strong oxidizing agents. Non-limiting examples of inorganic acid dopants include, but are not limited to, hydrochloric acid, sulfuric acid, nitric acid, phosphoric acid, perchloric acid, and the like. Organic acid dopants include, but are not limited to, methane sulfonic acid, camphor sulfonic acid, p-toluene sulfonic acid, acetic acid, citric acid, naphthalene sulfonic acid, and the like; and polymeric acids include, but are not limited to, polystyrene sulfonic acid, polyvinyl sulfonic acid, and the like. Other strong oxidizing agents that may be used as dopants include, but are not limited to, fluoroborates ($BF_4^-$), ferric chloride, inorganic chlorides, inorganic perchlorates, dodecylbenzenesulfonate, oxalates, toluene sulfonate, arsenic pentafluoride ($AsF_5$), antimony pentafluoride ($SbF_5$), iodine, and the like.

Selection of a dopant is based upon the conductive polymer that is present in the colloid. When the conductive polymer comprises PANI, for example, a dopant such as nitric acid ($HNO_3$) is provided to generate charge carriers along the polymer backbone. In another embodiment, the dopant behaves like a p-type dopant, acting as a counter ion to a positively charged polymer. Dopants provided to PTh and PPy include, but are not limited to, fluoroborates, ferric chloride, inorganic chlorides, inorganic perchlorates, dodecylbenzenesulfonate, oxalates, toluene sulfonate, organic acids, and inorganic acids. Dopants provided to PPV include, but are not limited to, ferric chloride, $AsF_5$, $SbF_5$, and iodine.

At least one conventional polyelectrolyte, such as, but not limited to, polyacrylic acid (also referred to hereinafter as "PAA"), poly(methylacrylic acid), poly(styrene sulfonic acid), poly(vinyl sulfonic acid), poly(2-acrylamido-2-methyl propane sulfonate), poly(methyl vinyl ether-alt-maleic acid), and poly(butadiene-alt-maleic acid) are also present in the colloid. In a preferred embodiment, the at least one polyelectrolyte includes PAA. Although the colloid and colloid composite are frequently referred to herein as "PANI" colloids, it is understood that other conductive polymers, such as, but not limited to, PPy, PTh, PPV, and PEDOT may be substituted for PANI. Similarly, while the polyelectrolyte is referred to as "PAA" throughout the description, other polyelectrolytes described hereinabove may be substituted for PAA.

In one embodiment, the at least one metal is a noble metal, such as, but not limited to, gold, platinum, silver, and combinations thereof. The morphology and size of the resulting metal—or metals—depend on the concentration of metal ions in the aqueous solution and how the colloid and aqueous solution containing the metal ions are admixed. When the aqueous solution is incrementally added to the colloid, nanoparticles having a narrow size distribution in a range from about 2 nm to about 12=n are obtained. In one embodiment, the size of the nanoparticles is in a range from about 2 nm to about 4 mm, whereas the size of the nanoparticles in another embodiment is in a range from about 5 nm to about 12 nm. An increase in metal ion concentration leads to the formation of larger nanoparticles. Combining the colloid with all of the aqueous solution in a single step yields a nanosheet of metal. In the case of silver, the nanosheet may have a thickness of up to about 20 nm and lengths and widths in a range from about 100 nm to about 400 nm.

The metal nanoparticles obtained by the methods described herein may be substantially crystalline. In one embodiment, the nanoparticles are single crystals of the at least one metal.

In one embodiment, the at least one metal, once in elemental form, is recovered from the admixture. This is particularly advantageous when the method described hereinabove is adapted to remove the metal ions from an aqueous solution, such as in the case of environmental remediation. The metal may be recovered by dissolving the conductive polymer and separating the metal by centrifugation. Alternatively, the metal may be recovered by thermally decomposing the conductive polymer. In one embodiment, the thermal decomposition of the polymer is carried out at about 300° C.

In one embodiment, a method of reducing a concentration of a metal contaminant in an aqueous solution is provided. As described hereinabove, a colloid comprising at least one conductive polymer and a polyelectrolyte is admixed with an aqueous solution comprising the ions of at least one metal to form a plurality of nanoparticles of the at least one metal in elemental form. At least a portion of the plurality of nanoparticles is disposed in a portion of the colloid to form a composite colloid. The composite colloid containing the portion of the at least one metal is then recovered from the water, thus reducing the concentration of the at least one metal in the aqueous solution.

Figure 2A:
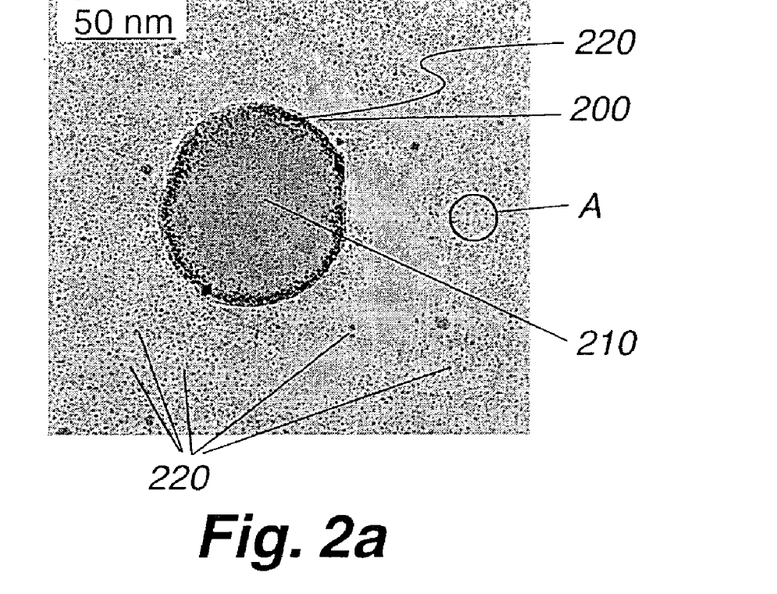
FIG. 2a is a transmission electron microscopy (TEM) micrograph showing an undoped polyaniline (PANI) colloid and homogeneously dispersed silver nanoparticles.
Figure 2B:
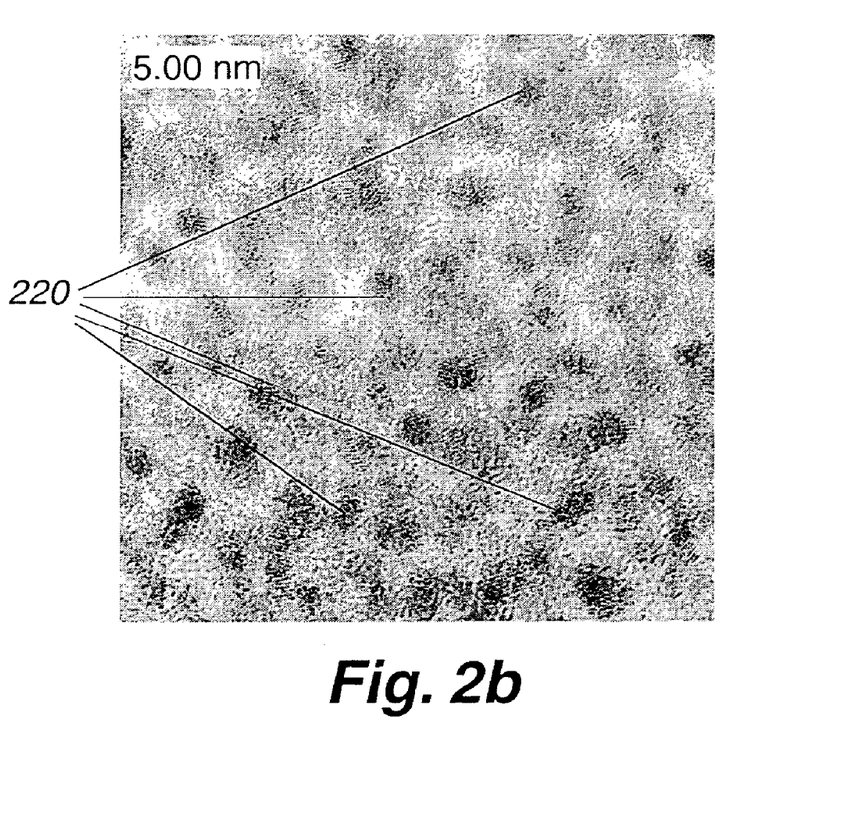
FIG. 2b is high magnification TEM image of region A in FIG. 2a, showing the homogeneously dispersed silver nanoparticles.

FIG. 2a is a transmission electron microscopy (TEM) image of an undoped composite colloid and an assemblage of silver nanoparticles that have been formed according to the methods described hereinabove. Colloid composite 200 comprises a colloid 210 that includes a conductive polymer, a polyelectrolyte, and a plurality of nanoparticles 220, which are disposed around the periphery 212 of colloid composite 200. In the colloidal composite 200 shown in FIG. 2a, the conductive polymer is PANI and the polyelectrolyte is PAA. In addition to being deposited in the periphery 212 of colloid 210, a large number of silver nanoparticles 220 are dispersed throughout the aqueous solution. The dispersed nanoparticles 220 (region A in FIG. 2a) are shown in higher magnification in FIG. 2b.

Figure 3:
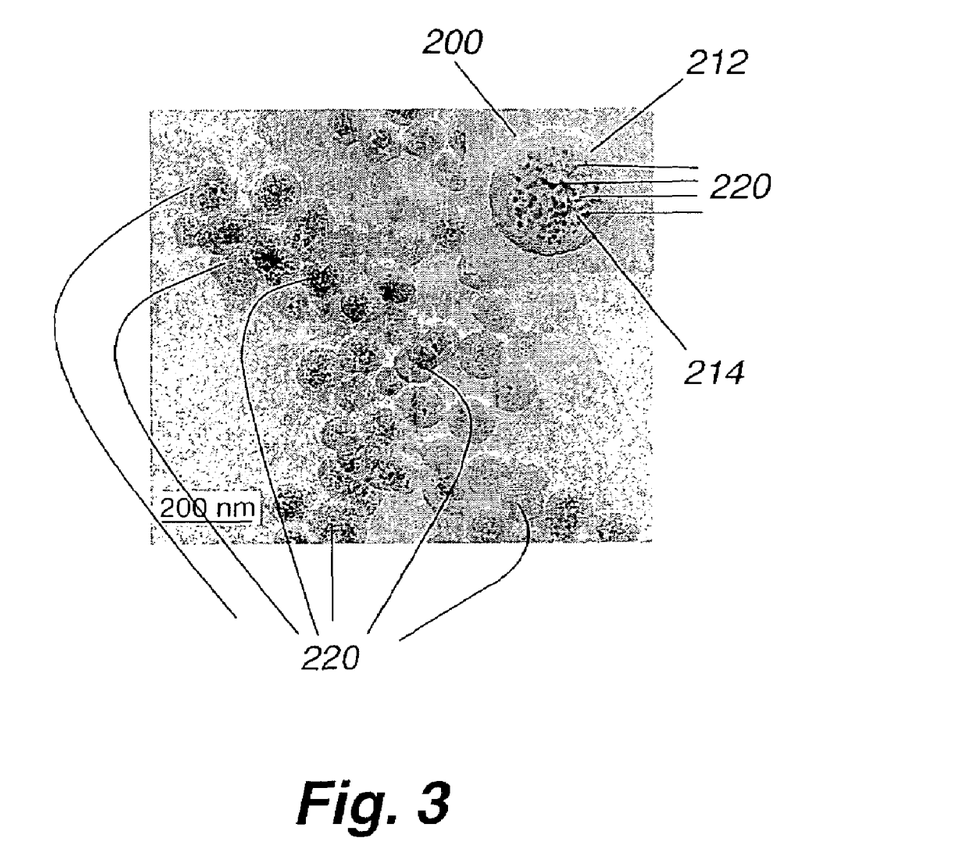
FIG. 3 is a TEM micrograph showing silver nanoparticles homogeneously dispersed within doped PANI colloids, with an inset showing an isolated PANI colloid containing silver nanoparticles.

Because these PANI colloids are robust and can sustain repeated doping and de-doping cycles, doped PANI colloids may also be used to synthesize nanoparticles 220. When the doped PANI colloid is used to synthesize nanoparticles, no nanoparticles 220 are present outside the PANI colloids 210. A TEM image of composite colloid 200 comprising doped PANI and silver nanoparticles is shown in FIG. 3. The as-synthesized silver nanoparticles 220 reside within the inner core region 214 of the doped PANI colloid, as shown in the inset in FIG. 3.

Because the synthesis of conductive polymer colloids uses steric stabilizers, the PANI colloid 210 comprises a spherical outer layer 212 that is PAA rich, and an inner core 214 that is a homogeneous mixture of PANI and PAA. Due to their unique structure, processibility, and redox properties, PANI colloids can reduce the metal ions that are drawn to its vicinity by PAA through electrostatic interaction. Polyaniline is chosen as a prime candidate for synthesizing metals and metal nanoparticles because it is inexpensive, easy to synthesize, and environmentally stable. Since the synthesis is carried out in aqueous solutions and the synthetic procedure does not involve reducing agents such as hydrazine, the procedure is environmentally benign and can easily be scaled up for high-volume production. PANI has several oxidation states: leucoemeraldine base; emeraldine base; and pernigranilin base, that can be easily controlled through chemical and electrochemical methods.

Polyaniline is the name given to the polymer having, in a completely reduced leucoemeraldine oxidation state, the following general structure:

where n is greater than 1. Alternatively, each of the rings may include, independently and at each occurrence, a substituent, such as, but not limited to: organic groups, including, $CH_3$, $C_2H_5$, $OCH_3$, and $N(CH_3)_2$; an inorganic group, including, F, Cl, Br, I, and the like; or a metal chelate group. For the polyanilines described herein, the appropriate choice of substituents permits a greater range of solubility in a greater number of different types of solvents, which results in increased versatility for processing the polymers and a greater range of chemical properties.

The present invention also provides a method of making nanoparticles of at least one metal. In one embodiment, the at least one metal is a noble metal, such as, but not limited to, gold, platinum, silver, and combinations thereof. An aqueous solution containing metal ions is added incrementally to an aqueous solution of a colloid comprising a conductive polymer (such as, for example, PANI) and a polyelectrolyte (such as, for example, PAA). The metal ions are drawn to the vicinity of the colloids by the polyelectrolyte. Upon contact, the conductive polymer reduces the metal ions, turning them into nanoparticles of the at least one metal in elemental form.

Synthesizing nanoparticles requires careful control of reaction parameters, such as reaction rate and the relative concentration between colloids and metal ions. Increasing the concentration of $AgNO_3$, for example, leads to the formation of nanodisks having diameters of up to 150 nm. Admixing all of the metal ion solution into the colloidal dispersion in a single addition results in the formation of larger particles or sheets. To synthesize silver nanoparticles, an $AgNO_3$ solution is added incrementally at a rate of 0.05 ml every 2 hours, with constant stirring. Silver nanoparticles having a narrow size distribution in a range form about 2 nm to about 4.5 nm, as determined from TEM images, are obtained.

The nanoparticles prepared by the methods described herein exhibit good stability, as evidenced by their dispersibility. For example, the nanoparticles remain dispersed in an aqueous solution for several weeks before they begin to settle out of solution. However, such nanoparticles can be re-dispersed into water by simply shaking the solution. Some of the nanoparticles have a clear crystalline plane oriented along a specific crystallographic direction.

The above results indicate that PAM reduces the metal ions to form metal nanoparticles, which in turn cause PANI to self-oxidize to a higher oxidation state. Each PANI repeating unit can convert two single-charged metal ions into two metal atoms. While not wishing to be bound by the present explanation, it is believed that the anionic PAA, as part of the PANI colloid, may draw the metal ions to the vicinity of the colloidal dispersion. Once these ions come into contact with a conductive polymer such as PANI, they are reduced to form nanoparticles.

The following examples serve to illustrate the features and advantages of the present invention, and are not intended to limit the invention thereto.

Materials and Analytical Tools

Aniline (99.5%, Aldrich) was distilled before use. Ammonium peroxydisulfate (99%, Fisher Scientific) was used as received.

UV-visible spectra were obtained using a Hewlett Packard 8453 Spectrometer.

Infrared spectra were obtained from pressed pellets on a Mattson, Galaxy series FTIR 5000 spectrometer. Transmission electron micrographs (TEM) were taken with a Phillips CM-30 transmission electron microscope.

EXAMPLE 1

The typical procedure for synthesizing PANI colloids for use in the processes described herein is as follows. First, 0.60 g PAA, (molecular weight (MW) 240,000; 0.0042 mole) and 0.62 g aniline were dissolved in 20 ml water. The PAA/aniline solution was adjusted to a pH of 1 by addition of concentrated sulphuric acid ($H_2SO_4$). The solution was stirred for two hours and then cooled to 0° C. in ice. Next, 1.52 g ammonium persulfate was dissolved in 10 ml of water and added to initiate the polymerization of aniline. A dark-green solution was obtained after 4 hours. The solution was then purified by dialysis in deonized (DI) water. In this procedure, the ratio of aniline to PAA repeat units is 0.8:1. The resulting PANI colloids were dialyzed with deionized water, neutralized with 3% $NH_4OH$, and once again dialyzed in deionized water. An undoped 1.8 weight percent colloidal aqueous solution was obtained. Half of the purified PAA-PANI (emeraldine base, also referred to herein as "EB") was doped with nitric acid ($HNO_3$) and then dialyzed in deionized water to yield PANI colloids doped with 1.2 weight percent $HNO_3$. Nitric acid was used to dope the PANI colloids rather than HCl to avoid forming any insoluble silver salt (AgCl). Transmission electron microscopy (TEM) images show that the PANI colloids exhibited a spherical morphology with each having a size in a range from about 100 nm to about 150 nm.

EXAMPLE 2

The procedure for preparing silver nanoparticles using undoped PANI colloids is as follows. The procedure began with a 1.8 weight percent PAA-PAN (EB) colloidal dispersion aqueous solution from Example A, equivalent to 20 mM PANI. A small portion (1.0 ml) of the aqueous PANI colloidal solution was poured into a vial. Every two hours, 0.05 ml of 30 mM $AgNO_3$ was added to the PANI colloid solution until 1.4 ml of the $AgNO_3$ solution had been added. At this point, the solution was stirred overnight to ensure the complete reduction of $Ag^+$. In the final step, the silver nanoparticles and PANI colloid solution were dialyzed against deionized water to remove the excess ionic residue by using a tubular membrane with a molecular cut off (MWCO) at 3,500. While some of the solution was retained for analysis, a portion of the solution was used to cast a thin film on a substrate.

The resultant solution was used for TEM analysis and the as-cast thin film was used for x-ray and electron diffraction spectroscopy. The results from these studies were used to characterize the structure of the silver nanoparticles. The peaks observed in the x-ray diffraction pattern of a drop-cast thin film comprising the as-synthesized PANI colloids and silver nanoparticles were attributed to the silver nanoparticles, and it was concluded from the electron diffraction and x-ray diffraction spectra that the final product consists of silver nanoparticles.

EXAMPLE 3

Figure 4:
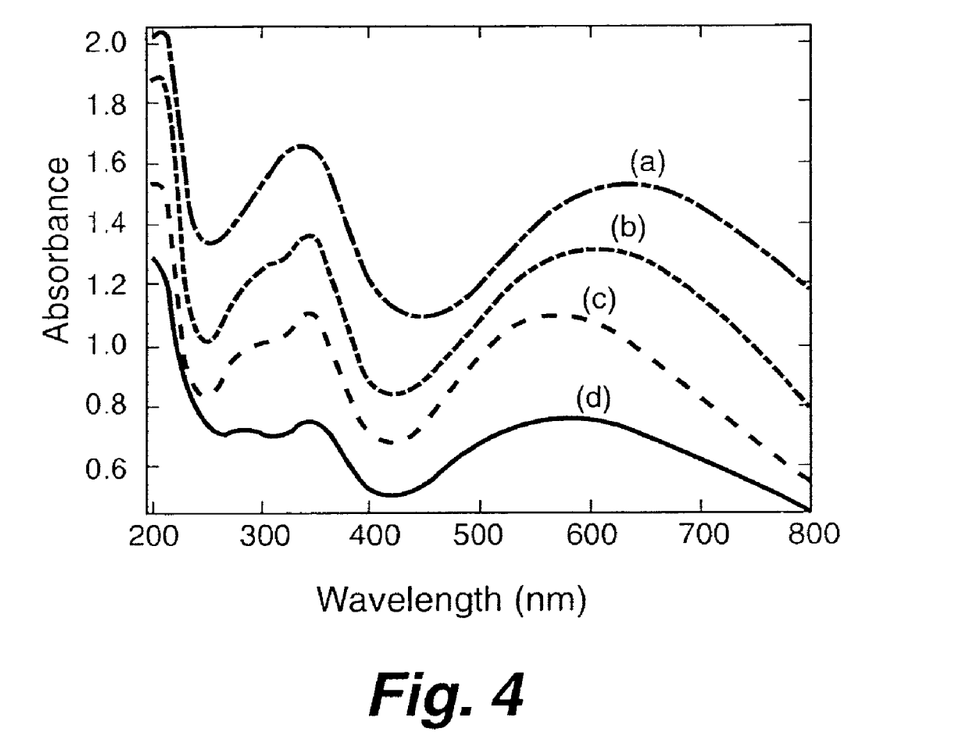
FIG. 4 shows final UV-visible spectra of a PANI colloid dispersion after reacting with (a) 0 (b) 0.5 (c) 1.0, and (d) 1.5 ml of a 1.4 mmol silver nitrate ($AgNO_3$) aqueous solution.

In an effort to determine how silver ions were converted into silver nanoparticles, UV-visible spectroscopy was used to monitor changes in the oxidation states of the PANI during the reaction. In this experiment, 0.5 ml, 1.0 ml, and 1.5 ml aliquots of 1.4 mmol aqueous $AgNO_3$ solution were added to three 1 ml (1.8 weight percent) undoped PANI colloid solutions, respectively. The 0.01 ml solutions were taken from each sample and added to a 2 mm quartz cell containing 0.5 ml water. The UV-visible spectra, shown in FIG. 4, were taken after the reactions were complete. As the molar ratio of PANI colloids versus $Ag^+$ ions decreased, a new peak was observed at about 300 nm. A blue shift in the exciton peak from 630 nm to 570 nm was also observed. Because PAA does not have absorption at the 200-800 nm region, the changes observed in the UV-visible spectra of PANI colloids directly reflect changes in the PANI component. This result is consistent with the change of the PANI oxidation states from the emeraldine base to the pernianiline base.

EXAMPLE 4

A procedure similar to that used to convert silver ions ($Ag^+$) to silver metal (Ag) nanoparticles was applied to the synthesis of gold (Au) nanoparticles. The procedure for preparing gold nanoparticles by using undoped PANI colloids was as follows. The procedure began with the preparation of a 1.8 weight percent PAA-PANI (EB) colloidal dispersion aqueous solution, equivalent to 20 mM PANI, and introduction of 1.0 ml of the colloidal solution into a vial. Every two hours, 0.05 ml of 10 mM $AuCl_3$ solution was added into the PANI colloid solution until all 1.4 ml of the $AuCl_3$ solution had been added. The solution was then stirred overnight to ensure the complete reduction of $Au^{3+}$.

Figure 5A:
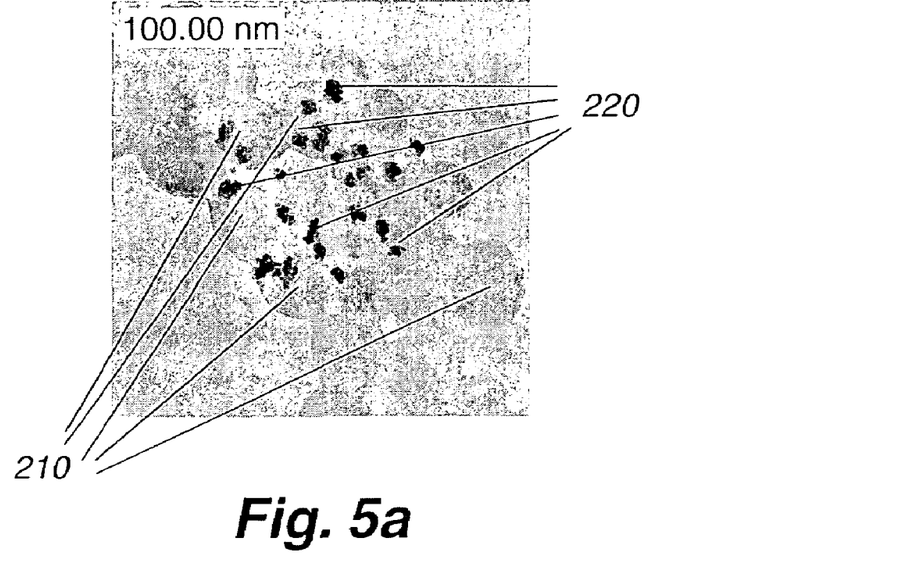
FIG. 5a is a TEM micrograph showing gold nanoparticles synthesized using undoped PANI colloids.

When undoped PANI colloids were used to synthesize gold nanoparticles, almost all of the nanoparticles 220 aggregated at the outer surface of the PANI colloids, as shown in FIG. 5a, to form domains with a random morphology and a size distribution that ranged from about 20 nm to about 50 nm. This situation was somewhat different from that of the silver nanoparticles that were formed using undoped PANI, where most of the silver nanoparticles were evenly dispersed throughout the solution.

Figure 5B:
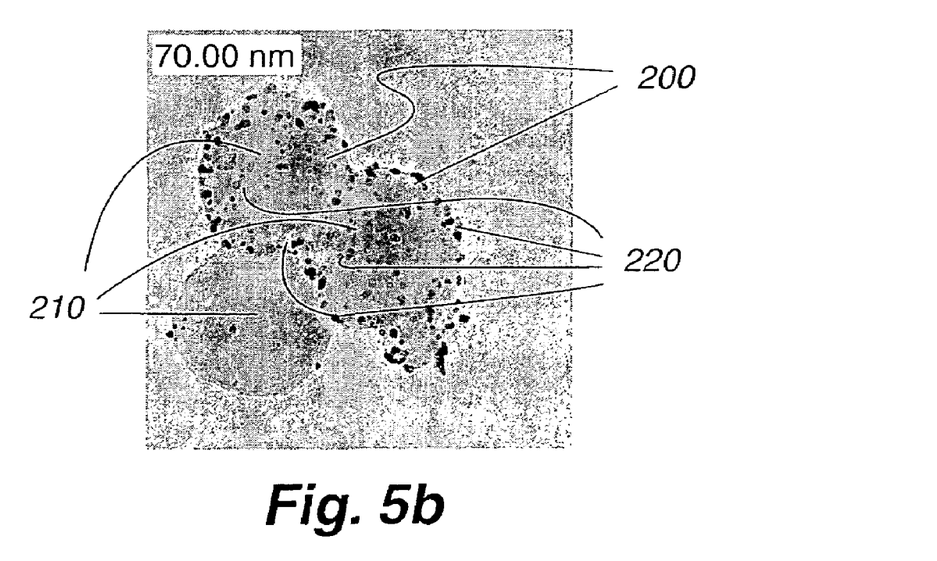
FIG. 5b is a TEM micrograph showing gold nanoparticles synthesized using doped PANI colloids.

As with the synthesis of silver nanoparticles formed using doped PANI, gold nanoparticles were distributed mainly within the colloidal domain (FIG. 5b). Moreover, no gold nanoparticles were observed outside of the PANI colloids. The average size of the gold nanoparticles was estimated to be between about 7 nm and about 12 nm.

The synthesis of gold nanoparticles resulted in a solution that turned slightly purple. This color presumably occurred as a result of the formation of pernigraniline and gold nanoparticles, caused by the reduction of $Au^{3+}$ to elemental gold nanoparticles. The $Au^{3+}$ reduction seemed to have pushed the PANI farther into the oxidized form, mainly because three electrons are needed by PANI to transform $Au^{3+}$ into a neutral gold atom. In contrast to the reduction of gold, only one electron is needed to reduce $Ag^+$ to a neutral silver atom. The reduction potential of $Au^{3+}$ is about 1.5 V, which is significantly higher than that of $Ag^+$ (0.8 V).

When comparing these two reactions (which are carried out using exactly the same amount of PANI colloids and moles of metal ions), a higher yield of silver was expected.

TEM results confirmed that the number of silver nanoparticles obtained was much higher than that of gold nanoparticles.

Figure 6:
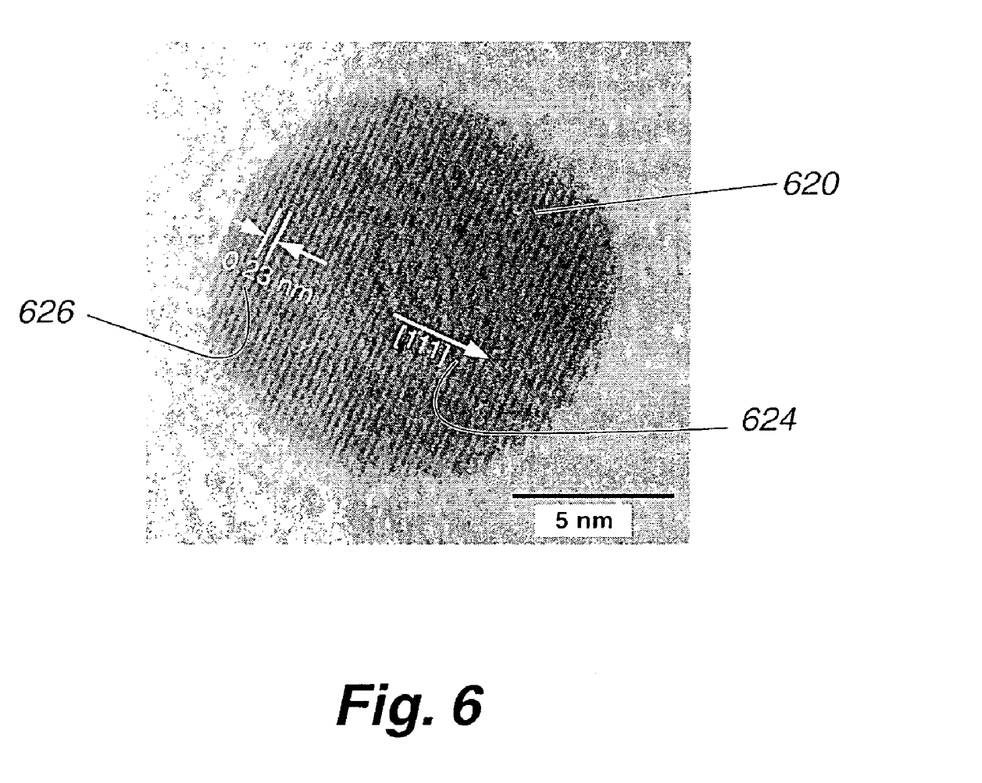
FIG. 6 is a HREM image showing a typical 11 nm gold nanoparticle that was half-trapped at the periphery of a PANI colloid.

FIG. 6 shows a TEM micrograph of a gold nanoparticle that was partially trapped at the periphery of a PANI colloid. The gold nanoparticle 620 seen in FIG. 6 has a diameter of about 11 nm. The clearly observed [111] crystallographic plane 624 suggests that nanoparticle 620 is a single crystal gold nanoparticle. The distance 626 between the crystalline planes 624, calculated from nanoparticles 620, was determined to be 2.3 Å, which is consistent with the lattice parameters of gold metal.

The presence of gold nanoparticles was further confirmed by x-ray diffraction spectroscopy, in which (111), (200), (220), (311), and (222) peaks were identified. The broadening of the X-ray diffraction peaks caused by the size of the gold nanoparticle is consistent with results reported for other nanocrystalline materials.

EXAMPLE 5

Platinum nanoparticles were synthesized by adding 0.05 ml of 15 mM $K_2PtCl_4$ incrementally every 2 hours to 1.0 ml of undoped PANI colloids (1.8 weight percent) solution until 1.5 ml of the $K_2PtCl_4$ solution had been added. The synthesis of platinum nanoparticles is particularly interesting, due to potential applications of platinum nanoparticles in catalysis and energy storage. Fourier transform analysis of TEM images of the platinum nanoparticle confirmed the presence of (200), (111), and (11$\bar{1}$) crystallographic planes, and indicated that the distances between the crystalline planes were 1.98, 2.29, and 2.29 angstroms, respectively, which is consistent with the lattice parameters reported for platinum metal. In addition, the angles between the crystalline facets are determined to be 54.7 degrees between the (200) and (111) planes, and 70.5 degrees between the (111) and (11$\bar{1}$) planes. Hexagonal crystalline facets usually occur at low-index (low-energy) surfaces.

The reduction of metal ions to metal nanoparticles by conductive polymers requires that the redox potentials between metal ions and conductive polymers be matched; i.e., the reduction potential of the metal ions should be greater than the reduction potential of the conductive polymer.

The estimated reduction potentials of polyaniline, derived from cyclic voltametry measurements of PANI using a saturated calomel electrode (SCE), were 0.2-0.3 V and 0.55-0.70 V, respectively, depending on the scan rate and electrolytes used. When $H_2$ was used as the reference electrode, the reduction potentials of the PANI were 0.4-0.5 V and 0.75-0.90 V, respectively. In the emeraldine-based form, polyaniline can reduce metal species having a reduction potential of greater than 0.75 V. Where a leucoemeraldine base was used, metal ions having a redox potential greater than 0.4 V were expected to be reduced to form metal nanoparticles.

The reduction potentials of $Ag^+$, $Au^{3+}$, and $PtCl_4^{2-}$ are 0.8, 1.5, and 0.755, respectively. These ions can be reduced by polyaniline, emeraldine base, in both doped and undoped forms to form metals and metal nanoparticles. A slower reduction of $PtCl_4^{2+}$ was observed, as compared to the reduction of $Ag^+$ and $Au^{3+}$. This may be due to the reduction potential of PANI (0.75-0.85 V) which is comparable to that of the reduction potential of $PtCl_4^{2+}$ (0.755 V). As monitored by the change of UV-visible spectroscopy of PANI colloid, the rate of reduction was faster for metal ions with higher reduction potential. This difference in reduction rate is also believed to be responsible for the size distribution of the resulting nanoparticles. The relatively small difference (<0.1V) in reduction potential between PANI colloids and metal ions, such as $PtCl_4^{2+}$ and $Ag^+$, resulted in platinum and silver nanoparticles, each having a size in a range from about 2 nm to about 4 nm. In contrast, the difference in reduction potential between PANI colloids and $Au^{3+}$, which is relatively large (about 0.7 V), led to the formation of gold nanoparticles in a size range of between about 5 nm and about 12 nm. $Cu^{+2}$, having a reduction potential of 0.34 V, did not form metal nanoparticles upon addition to both doped and undoped forms of PANI colloids.

Other conductive polymer colloids may be used to synthesize silver and gold nanoparticles. For example, PANI colloids were replaced with polypyrrole, polythiophene colloidal dispersion, and PEDOT, using the same procedure followed as those used with the PANI colloids. The as-synthesized silver and gold nanoparticles have larger nanoparticle sizes, ranging from about 5 m to about 25 nm. TEM and X-ray diffraction analyses of the above products confirmed the formation of silver and gold nanoparticles.

EXAMPLE 6

The typical procedure for synthesizing PPy colloids for use in the processes described herein is as follows. First, 0.30 g PAA, (MW 240,000; 0.0042 mole of the repeat unit) was dissolved in 10 ml water, followed by addition of 0.2 g pyrrole (0.0030 mole) and 0.2 g $H_2SO_4$ to the aqueous solution. The mixture was stirred for one hour and 0.68 g of ammonium persulfate (0.0030 mole), dissolved in 5 ml water, was added to the PAA-PPy solution to initiate the polymerization of pyrrole. The polymerization reaction began immediately after mixing. A brown colloid dispersion was obtained after 2 hours and purified by dialysis in DI water for more than 48 hours.

The procedure for preparing silver nanoparticles using undoped PPy colloids is as follows. To the solution of 1 ml 2.1% PAA-PPy, 0.05 ml of 0.030M $AgNO_3$ solution was added every 2 hours, until a total of 1.4 ml of the $AgNO_3$ solution had been added. The solution was stirred over night to ensure that the reaction went to completion. The final solution was dialyzed with DI water to remove the excess ionic residue, using a tubular membrane having a molecular cut off (MWCO) at 3,500.

The procedure for synthesizing gold nanoparticles using PPy colloids is as follows. To the solution of 1 ml 2.1% PAA-PPy, 0.05 ml of 0.020 mM $AuCl_3$ solution was added every 2 hours, until a total of 1.4 ml of the $AuCl_3$ solution had been added. The solution was stirred over night to ensure that the reaction went to completion. The final solution was dialyzed with DI water to remove the excess ionic residue by using a tubular membrane with a molecular cut off (MWCO) at 3,500.

EXAMPLE 7

The procedure for synthesizing gold nanoparticles using PEDOT colloids is as follows. PEDOT (Poly(3,4-ethylenedioxythiophene)) sold under the trademark Baytron P®, was obtained from Bayer. The PEDOT concentration in the solution is 1%. To 1 ml of the Baytron P® solution, $AuCl_3$ (0.0220 M) was added in 0.05 ml increments until 1 ml of the gold solution had been added. The resulting solution was stirred over night to ensure that the reaction had gone to completion. To remove excess ionic residue, the final solution was dialyzed with DI water using a tubular membrane with a molecular cut off (MWCO) at 3,500.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A method of making a metal nanoparticle from a colloid, the method comprising the steps of:
   a) providing a colloid, the colloid comprising at least one conductive polymer and at least one polyelectrolyte, the at least one conductive polymer having a reduction potential;
   b) providing an aqueous solution comprising metal ions, wherein the metal ions have a reduction potential that is greater than the reduction potential of the at least one conductive polymer; and
   c) admixing the colloid and the aqueous solution to form the metal nanoparticle wherein the metal nanoparticle remains disposed in a portion of the colloid.

2. The method according to claim 1, further including the step of recovering the metal nanoparticle.

3. The method according to claim 2, wherein the step of recovering the metal nanoparticle comprises one of dissolving the at least one conductive polymer and thermally decomposing the at least one conductive polymer.

4. The method according to claim 1, wherein the at least one conductive polymer is selected from the group consisting of polyaniline, polypyrrole, polythiophene poly(phenylene vinylene), polyfluorene, poly(3,4-ethylenedioxythiophene), and combinations thereof.

5. The method according to claim 4, wherein the at least one conductive polymer is polyaniline.

6. The method according to claim 4, wherein the conductive polymer further comprises at least one dopant.

7. The method according to claim 6, wherein the at least one dopant is selected from the group consisting of inorganic acids, organic acids, polymer acids, fluoroborates, inorganic chlorides, inorganic perchlorates, dodecylbenzenesulfonate, oxalates, toluene sulfonate, arsenic pentafluoride, antimony pentafluoride, iodine, and combinations thereof.

8. The method according to claim 7, wherein the at least one dopant comprises nitric acid.

9. The method according to claim 1, wherein the at least one polyelectrolyte is selected from the group consisting of polyacrylic acid, poly(methylacrylic acid), poly(styrene sulfonic acid), poly(vinyl sulfonic acid), poly(2-acrylamido-2methyl propane sulfonate), poly(methyl vinyl ether-alt-maleic acid), poly(butadiene-alt-maleic acid), and combinations thereof.

10. The method according to claim 9, wherein the at least one polyelectrolyte comprises polyacrylic acid.

11. The method according to claim 1, wherein the metal ions comprise at least one noble metal.

12. The method according to claim 11, wherein the at least one noble metal is selected from the group consisting of gold, platinum, silver, and combinations thereof.

13. The method according to claim 1, wherein the formed metal nanoparticle has a nanosheet morphology.

14. The method according to claim 13, wherein the plurality of nanoparticles has an average dimension in a range from about 2 nm to about 12 nm.

15. The method according to claim 14, wherein the plurality of nanoparticles has an average dimension in a range from about 2 nm to about 4 nm.

16. The method according to claim 14, wherein the plurality of nanoparticles has an average dimension in a range from about 5 nm to about 12 nm.

17. The method according to claim 13, wherein the plurality of nanoparticles comprises substantially crystalline nanoparticles.

18. The method according to claim 17, wherein the plurality of nanoparticles comprises single crystal nanoparticles.

19. The method according to claim 1, wherein the colloid comprises a plurality of colloid spheres, wherein each of the colloidal spheres has an inner core and a spherical outer layer surrounding the inner core, wherein the inner core comprises a homogeneous mixture of the at least one conductive polymer and the at least one polyelectrolyte, and wherein the outer layer is enriched in the at least one polyelectroyte.

20. The method according to claim 19, wherein the metal ions are disposed in one of the inner core and the outer layer.

21. The method according to claim 1, further comprising the step of casting a film of the metal nanoparticle.

22. A method of making a plurality of metal nanoparticles, the method comprising the steps of:
   a) providing a colloid, the colloid comprising at least one conductive polymer and at least one polyelectrolyte, the at least one conductive polymer having a reduction potential;
   b) providing an aqueous solution comprising metal ions, wherein the metal ions have a reduction potential that is greater than the reduction potential of the at least one conductive polymer; and
   c) incrementally admixing the colloid and the aqueous solution to form the plurality of metal nanoparticles.

23. The method according to claim 22, wherein the at least one conductive polymer is selected from the group consisting of polyaniline, polypyrrole, polythiophene poly(phenylene vinylene), polyfluorene, poly(3,4-ethylenedioxythiophene), and combinations thereof.

24. The method according to claim 22, wherein the at least one conductive polymer is polyaniline.

25. The method according to claim 22, wherein the conductive polymer further comprises at least one dopant.

26. The method according to claim 25, wherein the at least one dopant is selected from the group consisting of inorganic acids, organic acids, polymer acids, fluoroborates, inorganic chlorides, inorganic perchlorates, dodecylbenzenesulfonate, oxalates, toluene sulfonate, arsenic pentafluoride, antimony pentafluoride, iodine, and combinations thereof.

27. The method according to claim 26, wherein the at least one dopant comprises nitric acid.

28. The method according to claim 22, wherein the at least one polyelectrolyte is selected from the group consisting of polyacrylic acid, poly(methylacrylic acid), poly(styrene sulfonic acid), poly(vinyl sulfonic acid), poly(2-acrylamido-2methyl propane sulfonate), poly(methyl vinyl ether-alt-maleic acid), poly(butadiene-alt-maleic acid), and combinations thereof.

29. The method according to claim 28, wherein the at least one polyelectrolyte comprises polyacrylic acid.

30. The method according to claim 22, wherein the metal ions comprise at least one noble metal.

31. The method according to claim 30, wherein the at least one noble metal is selected from the group consisting of gold, platinum, silver, and combinations thereof.

32. The method according to claim 22, wherein the plurality of metal nanoparticles has an average dimension in a range from about 2 nm to about 12 nm.

33. The method according to claim 32, wherein the plurality of metal nanoparticles has an average dimension in a range from about 2 nm to about 4 nm.

34. The method according to claim 32, wherein the plurality of metal nanoparticles has an average dimension in a range from about 5 nm to about 12 nm.

35. The method according to claim 22, wherein the plurality of metal nanoparticles comprises substantially crystalline nanoparticles.

36. The method according to claim 22, wherein the plurality of metal nanoparticles comprises single crystal nanoparticles.

37. The method according to claim 22, wherein the step of incrementally admixing the colloid and the aqueous solution comprises admixing a predetermined portion of the aqueous solution and the colloid at a predetermined time interval.

38. A method of making a plurality of metal nanoparticles from a colloid, the method comprising the steps of:
a) providing a colloid, the colloid comprising at least one conductive polymer and at least one polyelectrolyte, the at least one conductive polymer having a reduction potential;
b) providing an aqueous solution comprising metal ions, wherein the metal ions have a reduction potential that is greater than the reduction potential of the at least one conductive polymer; and
c) incrementally admixing the colloid and the aqueous solution to form the plurality of metal nanoparticles wherein the plurality of metal nanoparticles remains disposed in a portion of the colloid.

39. A method of reducing selected metal ions from a volume of water, the method comprising the steps of:
a) providing a colloid, the colloid comprising at least one conductive polymer and at least one polyelectrolyte, the at least one conductive polymer having a reduction potential;
b) providing an aqueous solution comprising the selected metal ions, wherein the selected metal ions have a reduction potential that is greater than the reduction potential of the at least one conductive polymer;
c) admixing the colloid and the aqueous solution to form a plurality of metal nanoparticles, wherein the plurality of metal nanoparticles remain disposed in a portion of the colloid, and,
d) recovering the plurality of metal nanoparticles, wherein the concentration of the selected metal ions within the aqueous solution is reduced.

* * * * *